United States Patent
Salah (10) Patent No.: US 11,013,578 B2
(45) Date of Patent: May 25, 2021

(54) METHOD TO CORRECT A DENTAL DIGITAL MODEL

(71) Applicant: DENTAL MONITORING, Paris (FR)

(72) Inventor: Philippe Salah, Paris (FR)

(73) Assignee: DENTAL MONITORING, Paris (FR)

( * ) Notice: Subject to any disclaimer, the term of this patent is extended or adjusted under 35 U.S.C. 154(b) by 93 days.

(21) Appl. No.: 16/156,217

(22) Filed: Oct. 10, 2018

(65) Prior Publication Data

US 2019/0105129 A1  Apr. 11, 2019

(30) Foreign Application Priority Data

Oct. 11, 2017  (EP) .................................... 17306372

(51) Int. Cl.
*G05B 19/4099* (2006.01)
*A61C 7/00* (2006.01)
(Continued)

(52) U.S. Cl.
CPC ............ *A61C 7/002* (2013.01); *A61C 9/0053* (2013.01); *G05B 19/4099* (2013.01);
(Continued)

(58) Field of Classification Search
CPC .. A61C 7/002; A61C 9/0053; G05B 19/4099; G05B 2219/35134; G05B 2219/45167;
(Continued)

(56) References Cited

U.S. PATENT DOCUMENTS

| | | | | |
|---|---|---|---|---|
| 6,540,512 B1 * | 4/2003 | Sachdeva | ................. | A61C 7/00 433/24 |
| 10,258,439 B1 * | 4/2019 | Kitching | ................. | A61C 7/002 |

(Continued)

FOREIGN PATENT DOCUMENTS

| | | | | |
|---|---|---|---|---|
| FR | 3027505 A1 * | 4/2016 | ............. | A61C 7/002 |
| WO | 2016/066651 A1 | 5/2016 | | |

OTHER PUBLICATIONS

Corresponding International Application, Application No. PCT/EP2018/086802 Communication Relating to the Results of the Partial International Search, dated Apr. 10, 2019.
(Continued)

*Primary Examiner* — Christopher E. Everett
(74) *Attorney, Agent, or Firm* — Cooper Legal Group, LLC; Ronald M. Kachmarik (57) ABSTRACT

A method of correction of a three-dimensional digital model of an arch of a patient or "reference model." The method includes the following steps: acquisition of at least one two-dimensional image of the arch, called updated image $(Ia_1;Ia_2)$, in actual acquisition conditions; search, for each updated image, of virtual acquisition conditions providing a two-dimensional image of the reference model, which maximizes the fit with the updated image, or "reference image" $(Ir_1;Ir_2)$; comparison of the reference image with the updated image to detect differences; and correction of the reference model to reduce said differences to get a corrected reference model.

15 Claims, 4 Drawing Sheets

(51) Int. Cl.
  *G06T 7/00* (2017.01)
  *G06T 19/20* (2011.01)
  *A61C 9/00* (2006.01)
(52) U.S. Cl.
  CPC .......... *G06T 7/0014* (2013.01); *G06T 19/20*
    (2013.01); *G05B 2219/35134* (2013.01); *G05B*
    *2219/45167* (2013.01); *G06T 2207/10008*
    (2013.01); *G06T 2207/30036* (2013.01); *G06T*
    *2219/2004* (2013.01)
(58) Field of Classification Search
  CPC .............. G06T 19/20; G06T 7/0014; G06T
    2219/2004; G06T 2207/10008; G06T
    2207/30036
  See application file for complete search history.

(56) References Cited

U.S. PATENT DOCUMENTS

| | | | |
|---|---|---|---|
| 2008/0318179 A1 | 12/2008 | Liu | |
| 2009/0291417 A1* | 11/2009 | Rubbert | G06F 19/3481 433/215 |
| 2011/0269091 A1 | 11/2011 | Li et al. | |
| 2013/0110469 A1* | 5/2013 | Kopelman | A61C 9/0053 703/1 |
| 2016/0228212 A1* | 8/2016 | Salah | G16H 50/50 |
| 2016/0239631 A1 | 8/2016 | Wu et al. | |
| 2018/0189434 A1* | 7/2018 | Zhou | G06F 30/23 |
| 2018/0204332 A1* | 7/2018 | Salah | A61C 7/002 |

OTHER PUBLICATIONS

G. Eckert, et al., "Mesh Based Shape Refinement for Reconstructing 3D-Objects From Multiple Images", IEE Conference Publication, Jan. 1, 2004 (Jan. 1, 2004), pp. 103-110, XP055054185.

G. Eckert, et al., "Shape Refinement for Reconstructing 3D-Objects Using an Analysis-Synthesis Approach", Proceedings 2001 International Conference on Image Processing, ICIP 2001—Thessaloniki, Greece, Oct. 7-10, 2001; Institute of Electrical And Electronics Engineers, New York, NY, vol. 3, Oct. 7, 2001 (Oct. 7, 2001), pp. 903-906, XP010563497, DOI: 10.1109/ICIO.2001. 958270, ISBN: 978-0-7803-6725-8.

Corresponding European Application, Application No. 17306372.8, European Search Report, dated Mar. 28, 2018, 3 pages.

* cited by examiner

METHOD TO CORRECT A DENTAL DIGITAL MODEL

TECHNICAL FIELD

The present invention relates to a method to correct a three-dimensional digital model of an arch of a patient, a computer program for implementing this method, an acquisition apparatus provided with this program, and a method to manufacture an orthodontic part from said model.

STATE OF THE ART

According to the most advanced methods, the manufacturing of an orthodontic appliance requires that an orthodontist scans the patient's arches to generate a three-dimensional digital model, or «initial reference model». With the help of a computer, the initial reference model is segmented to create, for each tooth, a three-dimensional digital model of each tooth, or «tooth model». Then, the orthodontist, or a laboratory with the help of the orthodontist, moves one or more tooth models of the initial reference model to obtain a "target reference model" or "set up". The initial and target models are used by the laboratory to manufacture one or more orthodontic parts accordingly, for instance aligners.

In the initial reference model, defects, i.e. differences between the initial reference model and the modelized patient's arch, may stem from the resolution of the scanner and/or from the way the scanner is operated.

Defects may also be generated when the initial reference model is not directly produced from a scan of the teeth, but is produced from a plaster mold of the teeth.

Finally, WO 2016/066651 discloses the generation of an updated reference model by the deformation of an initial reference model obtained from a scan of the teeth. Such deformation may also generate defects.

Some defects have no prejudicial consequences on the manufactured orthodontic appliance. No detection or correction of these defects is therefore required.

Some defects have prejudicial consequences on the manufactured orthodontic part and should be corrected whenever they can be detected and a correction is possible. Otherwise, the orthodontic treatment might go wrong. Therefore, the laboratory usually treats the models it receives to detect and correct these defects. These operations are time-consuming and costly.

In some cases, a defect cannot be corrected. For instance, it is so large that no interpolation is possible. Then, the laboratory must refuse the defective model and inform the orthodontist. The orthodontist must invite the patient for a new scan acquisition. Most time and money is lost. In addition, this additional visit is inconvenient for the patient and places stress on the orthodontist.

Last, the model might be affected with defects which cannot be detected but are prejudicial. Therefore, the orthodontic treatment will not take place normally, the patient will be angry and will place stress much on the orthodontist.

One aim of the present invention is to address, at least partially, the above-mentioned problems.

SUMMARY OF THE INVENTION

The invention provides a method of correction of a three-dimensional digital model of an arch of a patient, or "reference model", said method comprising the following steps:

1) acquisition of at least one two-dimensional image of said arch, called «updated image», in actual acquisition conditions;
2) search, for each updated image, of virtual acquisition conditions providing a two-dimensional image of the reference model, which maximizes the fit with the updated image, or "reference image";
3) comparison of the reference image with the updated image to detect differences;
4) correction of the reference model to reduce said differences to get a corrected reference model.

As will be seen in more detail herein below in the description, a method according to the invention makes it possible correcting a reference model with simple updated images, and in particular from photographs.

A method according to the invention may in particular include one or more of the additional characteristics of the depending claims.

Preferably, steps 2) to 4) are executed for more than two, more than five, preferably more than ten or more than fifty updated images. The number of remaining defects decreases accordingly.

Step 2) preferably comprises the following steps:
21) determination of virtual acquisition conditions to be tested;
22) production of a two-dimensional reference image of the reference model to be tested in said virtual acquisition conditions to be tested;
23) processing of the reference image to produce at least one reference map representing said discriminating piece of information;
24) comparison of the updated and reference maps so as to determine a value for an assessment function, said value for the assessment function depending on the differences between said updated and reference maps and corresponding to a decision to continue or to stop the search for virtual acquisition conditions approximating said actual acquisition conditions with greater accuracy than said virtual acquisition conditions to be tested determined on the last occurrence of the step 21);
25) if said value for the assessment function corresponds to a decision to continue said search, modification of the virtual acquisition conditions to be tested, then return to the step 22).

The reference model may be generated by a deformation of an initial reference model, which itself was produced by a scan of an arch of the patient. The reference model may in particular be an updated reference model produced according to the method disclosed in WO 2016/066651, incorporated by reference.

Such an updated reference model may in particular be used to evaluate an orthodontic treatment and/or modify an orthodontic treatment. In particular when the orthodontic appliance is an aligner, the updated reference model may be used to design new aligners.

The invention also concerns an acquisition apparatus comprising:
- an image acquisition apparatus, in particular a digital camera, to acquire updated images of an arch of a patient;
- a scanner configured to generate a reference model of said arch;
- a processing module configured to correct said reference model with said updated images to get a corrected reference model according to a method according to the invention, and preferably inform an operator if a defect cannot be corrected, and in particular if this defect has a potential prejudicial effect.

Preferably, the processing module is configured so that the information of the operator occurs less than five minutes, preferably less than one minute, preferably less than thirty seconds, preferably less than ten seconds, preferably less than one second after the correction of the reference model. Advantageously, if a reference model cannot be used, the operator of the acquisition apparatus is rapidly informed and may immediately generate a new reference model.

The corrected reference model may in particular be used to manufacture an orthodontic part.

The invention therefore also concerns a method to manufacture an orthodontic part, said method comprising, after the production of a corrected reference model according to steps 1) to 4), the following steps:

5) validation of the corrected reference model;
6) if the corrected reference model is validated, manufacture of said orthodontic part with the help of said corrected reference model.

The manufacture is preferably achieved by a centralized laboratory, i.e. a laboratory manufacturing appliances for a plurality of orthodontists.

The invention also relates to:
 a computer program, and in particular an application specifically for mobile phones, comprising program code instructions for the execution of one or more, preferably all, of the steps 2) to 4), when said program is run by a computer, and
 a computer medium on which is stored such a program, for example a memory or a CD-ROM.

Definitions

A "patient" should be understood to mean any person for whom a method is implemented in order to monitor the teeth thereof, whether this person is sick or not.

An "orthodontic part" refers to any part of an orthodontic apparatus, or to a complete orthodontic apparatus, for instance an aligner.

A «model» is a three-dimensional digital model, for example of .stl or .Obj, .DXF 3D, IGES, STEP, VDA, or point cloud type. Advantageously, a model, called "3D", may be observed from any angle.

A "defect" is a part of a model of a dental arch which does not correctly represent this arch. For instance, the model may represent asperities or recesses which, in reality, i.e. in the dental arch, do not exist. Preferably, the length of a defect is less than 5 mm, 3 mm, 2 mm or 1 mm.

Tunnels et bridges are usual examples of defects from 3D scans.

A defect can be, in particular, an excess of 3D material, a distorted incisal edge, a hole or a distortion in the mesh, a double skin, a push through, or an insufficient definition, an autointersection.

An excess of 3D material may stem from artefacts. For instance, a part of the tong may be represented in the model.

A distorted incisal edge is also a common defect. Indeed, the incisal edges are difficult to scan and the edges of the vestibular faces may not perfectly match the edges of the lingual faces.

A model is commonly a mesh of lines. It may locally present holes or distorsions so that it does not correctly represent the real teeth. In particular, the mesh may be irregular or may have regions in which it is not connex, i.e. which do not comprise any line common to different triangles of the model. A non-manifold mesh is also a defect, i.e. when more than two triangles are defining a common line of the 3D model.

Locally, a model may also comprise an overlap, i.e. a superposition of two layers, or "double skins", which should be avoided.

Finally, a model may have a precision which locally is too low, i.e. an insufficient definition.

An "image" is understood to be a two-dimensional image, like a photograph. An image is formed by pixels.

An «image of an arch» and a «model of an arch» are representations of a part or of a complete arch.

The "acquisition conditions" specify the position and the orientation in space of an image acquisition apparatus in relation to the teeth of the patient or to a tooth model of the patient, and preferably the calibration of this image acquisition apparatus. Acquisition conditions are called "virtual" when they correspond to a simulation in which the acquisition apparatus would be in said acquisition conditions (theoretical positioning and preferably calibration of the acquisition apparatus).

The "calibration" of an acquisition apparatus is made up of all the values of the calibration parameters. A "calibration parameter" is a parameter intrinsic to the acquisition apparatus (unlike its position and its orientation), the value of which influences the image acquired. Preferably, the calibration parameters are chosen from the group formed by the diaphragm aperture, the exposure time, the focal distance and the sensitivity.

A "scanner" is an apparatus making it possible to obtain a three-dimensional representation of an object.

A "discriminating piece of information" is a characteristic information which may be extracted from an image ("image feature"), conventionally by a computer processing of this image.

A discriminating piece of information may have a variable number of values. For example, an outline information may be equal to one or zero depending on whether a pixel belongs or does not belong to an outline. A brightness information may take a large number of values. The processing of the image makes it possible to extract and quantify the discriminating piece of information.

The discriminating information may be represented as a "map". A map is therefore the result of the processing of an image to make the discriminating piece of information more visible.

A point of an image, for instance a point of an outline of a tooth, results from the projection of a point of the dental arch of the patient along the observation direction during the acquisition of the image (direction of the objective of the image acquisition apparatus).

The point of the reference model representing this point of the dental arch is called "parent point" of the image point.

The "fit" between two objects is a measure of the difference between these objects. An object "best fits" another object when it results from an optimization treatment to reduce said difference below a determined threshold. The search of a reference image best fitting with the reference model is achieved by searching virtual acquisition conditions best fitting with the actual acquisition conditions.

Two images best fitting with each other substantially represent the same objet, in the same way. Put differently, the representations of the object on the two images are substantially superimposable.

An updated image also best fits with a reference model when a view of the reference model provides a reference image which best fits with the updated image.

Metaheuristic methods in particular comprise:
the evolutionist algorithms, preferably chosen from: evolution strategies, genetic algorithms, differential evolution algorithms, distribution estimation algorithms, artificial immunity systems, Shuffled Complex Evolution path recomposition, simulated annealing, ant colony algorithms, particle swarm optimization algorithms, taboo search, and the GRASP method;
the kangaroo algorithm,
the Fletcher and Powell method,
the noise method,
stochastic tunneling,
hill climbing with random restarts,
the cross entropy method, and
hybrids of the metaheuristic methods described above.

"Comprising a" or "including a" or "having a", should be understood to mean "including at least one", unless indicated otherwise.

BRIEF DESCRIPTION OF THE FIGURES

Other features and advantages of the invention will become more apparent on reading the following detailed description and on studying the attached drawing in which:

FIGS. 1 (1a, 1b, 1c) and 2 represent a drawing and a flow diagram, respectively, illustrating the implementation of a method of correction according to the invention, FIG. 5 illustrates the generation of an updated image with a separator (5a-5b), and the generation of an updated map from an updated image (5c-5d), FIG. 6 schematically illustrates the relative position of register marks 12 on updated images $14_1$ and $14_2$ of a separator 10, depending on the direction of observation (broken line).

DETAILED DESCRIPTION

A method according to the invention comprises the steps 1) to 4) mentioned above.

The reference model may be prepared from measurements performed on the teeth of the patient or on a physical mold of his or her teeth, for example a plaster mold.

The reference model is preferably created by means of a professional apparatus, for example by means of a 3D scanner, preferably implemented by a health professional, for example by an orthodontist or an orthodontic laboratory. In an orthodontic practice, the patient or the physical model of his or her teeth may advantageously be arranged in a precise position and the professional apparatus may be refined. The result thereof is a very accurate reference model. The initial reference model preferably provides an information on the positioning of the teeth with an error of less than 5/10 mm, preferably less than 3/10 mm, preferably less than 1/10 mm.

The reference model may also be an updated reference model prepared as disclosed in WO 2016 066651.

At step 1), an updated image Ia is taken of the arch by means of an image acquisition apparatus, in actual acquisition conditions. The image acquisition apparatus is preferably a digital camera.

In a preferred embodiment, step 1) occurs less than 1 hour, preferably less than 10 minutes, preferably than 5 minutes, preferably less than 1 minute after the reference model has been prepared from measurements performed on the teeth of the patient or on a physical mold of his or her teeth.

This is particularly useful when the image acquisition apparatus is part of the scanner used to prepare the reference mold and when the updated images are used to correct defects of this reference model.

The image acquisition apparatus may be part of an acquisition apparatus according to the invention. However, a method according to the invention does not require an accurate positioning of the image acquisition apparatus relative to the teeth.

Figure 5A:
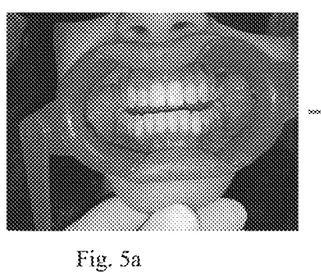
Figure 5B:
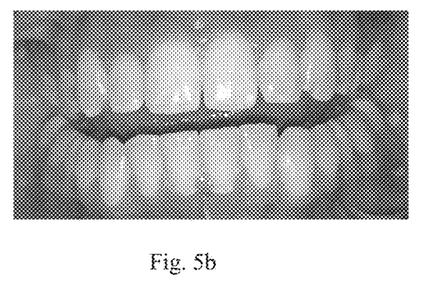

Preferably, a separator 10 is used, as represented in FIG. 5a. The first function of the separator is to separate the lips in order to improve the visibility of the teeth.

Step 1) may comprise one or more characteristics of step b) disclosed in WO 2016 066651, incorporated by reference.

A view of a "reference model" is called a "reference image".

Figure 3:
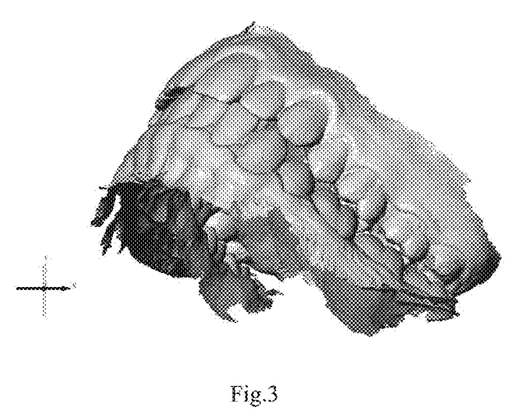
FIG. 3 is an example of a reference image, FIG. 4 (4a-4b) illustrates the generation of a reference map from a reference image.
Figure 4A:
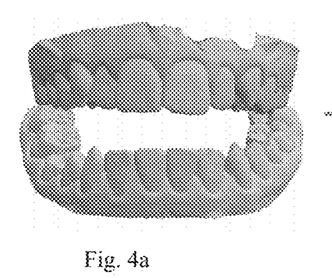

At step 2), the reference model is explored to find a reference image best fitting with the updated image. FIGS. 3 and 4a are examples of reference images.

Step 2) may comprise one or more characteristics of steps c), d), and e) disclosed in WO 2016 066651, as far as they concern the search of reference images best fitting with updated images.

Figure 5C:
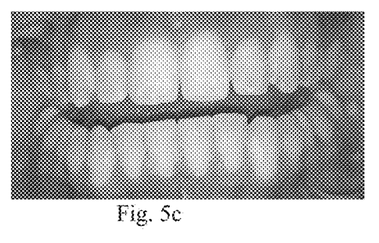
Figure 5D:
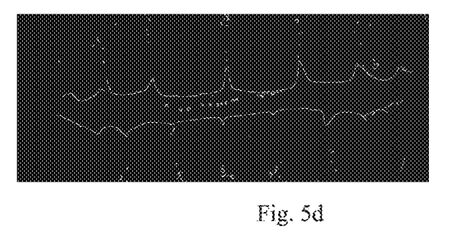

Preferably, the updated image is analyzed so as to produce an updated map relating to at least one discriminating piece of information (FIGS. 5c and 5d).

An updated map represents a discriminating piece of information in the reference frame of the updated image.

The discriminating information is preferably chosen from the group consisting of a piece of outline information, a piece of color information, a piece of density information, a piece of distance information, a piece of brightness information, a piece of saturation information, a piece of information on the glare and combinations of such pieces of information.

A person skilled in the art knows how to process an updated image to show the discriminating information. This processing comprises, for example, the application of masks or filters that are well known, supplied with the image processing software.

Figure 4B:
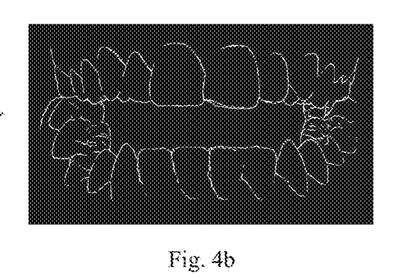

For example, FIG. 4b is an updated map relating to the outline of the teeth obtained from the updated image of FIG. 4a.

Preferably, virtual acquisition conditions roughly approximating the actual acquisition conditions are determined. In other words, at least the relative position of the image acquisition apparatus at the moment when the updated image was taken (position of the acquisition apparatus in space and orientation of this apparatus) is determined. This rough assessment advantageously makes it possible to determine a restricted set of virtual acquisition conditions likely to correspond to the actual acquisition conditions, and, in this set, virtual acquisition conditions constituting the best point of departure for the following operations. It therefore makes it possible to considerably speed up these operations.

One or more heuristic rules are preferably used. For example, preferably, there are excluded, from the virtual acquisition conditions likely to be tested in the following operations, the conditions which correspond to a position of the image acquisition apparatus behind the teeth or at a distance from the teeth greater than 1 m.

Figure 6:
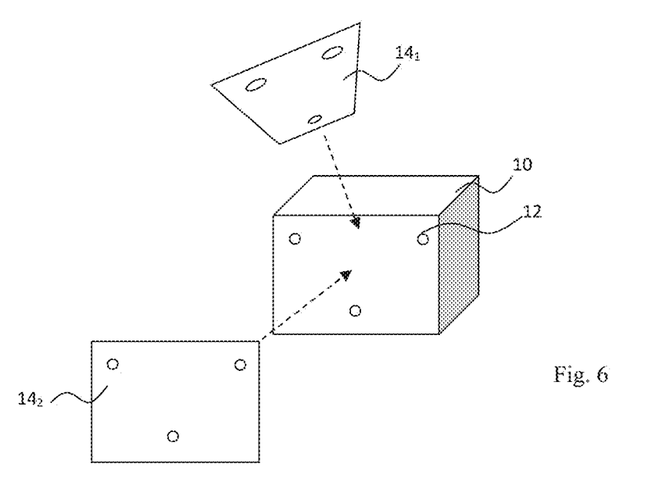

In a preferred embodiment, as illustrated in FIG. 6, register marks are used that are represented on the updated image, and in particular register marks 12 of the separator, to determine a substantially conical region of space delimiting the virtual acquisition conditions likely to be tested in the following operations, or "test cone".

Specifically, there are preferably at least three non-aligned register marks 12 on the separator 10, for example, and their relative positions are measured accurately on the separator.

The register marks are then identified on the updated image, as described previously. Simple trigonometrical computations make it possible to approximately determine the direction from which the updated image has been taken.

Then, for each updated image, a best fitting reference image is searched, preferably according to steps 21) to 25). Metaheuristic, preferably evolutionist, optimization methods, particularly in the simulated annealing methods, may be used for this search.

At step 21), virtual acquisition conditions "to be tested" are determined, that is to say a virtual position and a virtual orientation likely to match the actual position and orientation of the acquisition apparatus during the capture of the updated image, but also, preferably, a virtual calibration likely to match the actual calibration of the acquisition apparatus during the capture of the updated image.

The first virtual acquisition conditions to be tested may be random. Preferably, they are chosen from the restricted set which was previously roughly determined, and in particular from the virtual acquisition conditions corresponding to the most promising virtual acquisition conditions, that is to say those constituting the best springboard for approximating, as rapidly as possible, the actual acquisition conditions.

At step 22), the image acquisition apparatus is then virtually configured in the virtual acquisition conditions to be tested in order to acquire a reference image of the reference model in these virtual acquisition conditions to be tested. The reference image therefore corresponds to the image that the image acquisition apparatus would have taken if it had been placed, relative to the reference model to be tested, and optionally calibrated, in the virtual acquisition conditions to be tested.

If the updated image was acquired substantially at the same moment as when the reference model was produced, and if the virtual acquisition conditions to be tested are exactly the actual acquisition conditions, the reference image may therefore be exactly superimposed on the updated image. The differences between the updated image and the reference image result from errors in the assessment of the virtual acquisition conditions if they do not correspond exactly to the actual acquisition conditions.

At step 23), to compare the updated and reference images, the discriminating information is compared on these two images. More specifically, from the reference image, a reference map is produced representing the discriminating information (FIGS. 4a and 4b).

At step 24), the updated and reference maps, the two of them relating to the same discriminating information, are then compared and the difference between these two maps is assessed by means of a score. For example, if the discriminating information is the outline of the teeth, it is possible to compare the mean distance between the points of the outline of the teeth which appears on the reference image and the points of the corresponding outline which appears on the updated image, the score being all the higher as this distance shortens.

The score may for example be a coefficient of correlation.

Preferably, the virtual acquisition conditions comprise the calibration parameters of the acquisition apparatus. The score is all the higher as the values of the calibration parameters tested come closer to the values of the calibration parameters of the acquisition apparatus used at step 1). For example, if the diaphragm aperture tested is far from that of the acquisition apparatus used at step 1), the reference image exhibits blurred regions and sharp regions which do not correspond to the blurred regions and to the sharp regions of the updated image. If the discriminating information is the outline of the teeth, the updated and reference maps do not therefore represent the same outlines and the score will be low.

The score is then assessed by means of an assessment function. The assessment function makes it possible to decide whether the cycling to search the best fitting virtual acquisition conditions (steps 21) to 25)) must be continued or stopped. The assessment function may for example be equal to 0 if the cycling must be stopped or be equal to 1 if the cycling must continue.

The value of the assessment function may depend on the score reached. For example, it may be decided to continue the cycling if the score does not exceed a threshold. For example, if an exact match between the updated and reference images leads to a score of 100%, the threshold may be, for example, 95%. Obviously, the higher the threshold, the better the accuracy of the assessment of the virtual acquisition conditions if the score comes to exceed this threshold.

The value of the assessment function may also depend on scores obtained with virtual acquisition conditions tested previously.

The value of the assessment function may also depend on random parameters and/or on the number of cycles already performed.

In particular, it is possible, despite the repetition of the cycles, not to manage to find virtual acquisition conditions which are sufficiently close to the actual acquisition conditions for the score to reach said threshold. The assessment function may then lead to the decision to quit the cycling although the best score obtained has not reached said threshold. This decision may result, for example, from a number of cycles greater than a predetermined maximum number.

A random parameter in the assessment function may also authorize the continuation of tests of new virtual acquisition conditions, although the score appears satisfactory.

The assessment functions conventionally used in the metaheuristic, preferably evolutionist, optimization methods, particularly in the simulated annealing methods, may be used for the assessment function.

At step 25), if the value of the assessment function indicates that it is decided to continue the cycling, the virtual acquisition conditions to be tested are modified and a cycle is recommenced consisting in producing a reference image and a reference map, then in comparing this reference map with the updated map to determine a score.

The modification of the virtual acquisition conditions corresponds to a virtual movement in space and/or to a modification of the orientation and/or, preferably, to a modification of the calibration of the acquisition apparatus. This modification may be random. The modification is preferably guided by heuristic rules, for example by favoring the modifications which, according to an analysis of the preceding scores obtained, appear the most favorable to increase the score.

The cycling is continued until the value of the assessment function indicates that it is decided to exit from this cycling, for example if the score reaches or exceeds said threshold.

The optimization of the virtual acquisition conditions is preferably performed by using a metaheuristic method, preferably evolutionist, preferably a simulated annealing algorithm. Such an algorithm is well known for nonlinear optimization.

If the cycling was left, without a satisfactory score having been able to be obtained, for example without the score having been able to reach said threshold, the method may be stopped (failure situation) or restarted with a new discriminating piece of information and/or with a new updated image. The method may also be continued with the virtual acquisition conditions corresponding to the best score reached. A warning may be emitted in order to inform the user of the error on the result.

If the cycling was left as a satisfactory score was obtained, for example because the score reached, even exceeded, said threshold, the virtual acquisition conditions correspond substantially to the actual acquisition conditions.

Preferably, the virtual acquisition conditions comprise the calibration parameters of the acquisition apparatus. The method conducted thus makes it possible to assess the values of these parameters without it being necessary to know the nature of the acquisition apparatus or its setting. The step 1) may therefore be performed with no particular precautions.

Furthermore, the search for the actual calibration is performed by comparing an updated image with views of an initial reference model in virtual acquisition conditions to be tested. Advantageously, it does not require the updated image to show a standard calibration gauge, that is to say a gauge whose features are precisely known making it possible to determine the calibration of the acquisition apparatus.

The cycling results into virtual acquisition conditions best fitting the actual acquisition conditions.

The observation of the reference model in the virtual acquisition conditions provides a reference image best fitting with the updated image.

At step 3), the reference image is compared with the updated image. Differences correspond to defects to be corrected.

Preferably, to compare the reference and updated images, the corresponding reference and updated maps are compared. A superimposition of these two maps makes the differences, i.e. the defects, visible since the defects appear on the reference map, but not on the updated map.

At step 4), the reference model is corrected accordingly.

The correction might be done manually, with a computer enabling the modification of the reference model.

Preferably, the correction is done with at least one second updated image, as illustrated in FIG. 1 and described hereafter.

In FIG. 1, the discriminating information is a piece of outline information.

Figure 1A:
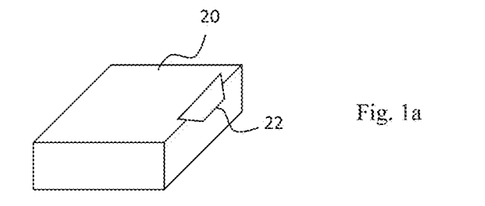

As represented in FIG. 1a, the reference model 20 comprises a defect 22. The first reference image $Ir_1$ has been acquired by observation of the reference model 20 in first virtual acquisition conditions simulating actual acquisition conditions under which the first updated image $Ia_1$ has been acquired. The treatment of the first reference image $Ir_1$ results in a first reference map $Cr_1$ which shows a first "reference" outline $31_1$ with the defect 22. The first updated map $Ca_1$, obtained from the first updated image $Ia_1$, represents a first "updated" outline $30_1$, on which the defect 22 is not visible (since it was not on the arch).

To compare the first updated image with the first reference image, the first updated map $Ca_1$ is superimposed with the first reference map $Cr_1$.

The superimposition makes the defect 22 visible.

The superimposition also provides a first correct outline portion, which should replace the defect 22, i.e. the points of the first updated outline which were not visible on the first reference map.

However, the first outline points $32_1$ of the first correct outline portion are not sufficient to determine the position of respective outline parent points 34 in the updated reference model 20. In particular, for a first outline point $32_1$, it is not possible identifying precisely the position of the outline parent point 34 along a straight line $\Delta_1$ including the first outline point and parallel to the observation direction.

Figure 1B:
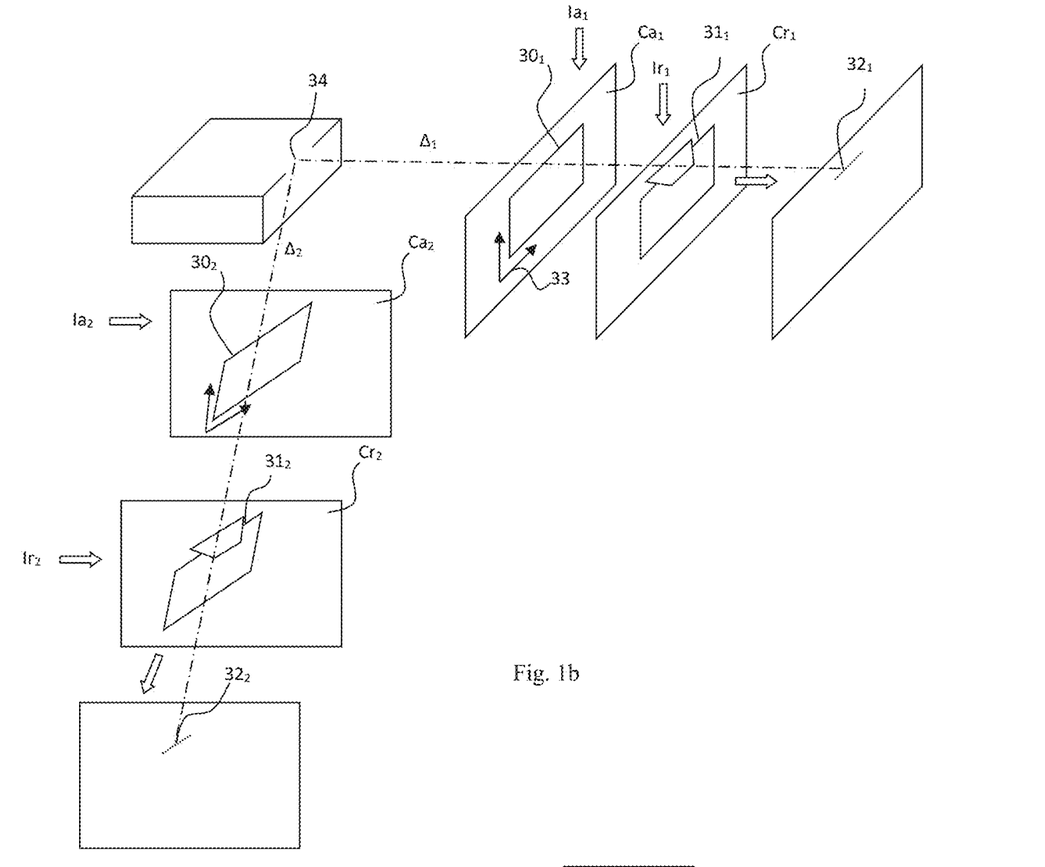

To determine the position of the outline parent point 34, a second updated image $Ia_2$ representing the defect 22, but acquired under a different observation angle than the first updated image, can be used.

The second updated image $Ia_2$ is treated in the same way as the first updated image $Ia_1$.

The second reference image $Ir_2$ has been acquired by observation of the reference model 20 in second virtual acquisition conditions simulating actual acquisition conditions under which the second updated image $Ia_2$ has been acquired. The treatment of the second reference image $Ir_2$ results in a second reference map $Cr_2$ which shows a second reference outline 312 with the defect 22.

The second updated map $Ca_2$, obtained from the second updated image $Ia_2$, represents a second updated outline 302, on which the defect 22 is not visible.

To compare the second updated image with the second reference image, the second updated map $Ca_2$ is superimposed with the second reference map $Cr_2$.

The superimposition makes the defect 22 visible.

The superimposition also provides a second correct outline portion, made of second outline points $32_2$, which should replace the defect 22, i.e. the points of the second updated outline which were not visible on the second reference map.

The transition between the first virtual acquisition conditions and the second virtual acquisition conditions transforms a plurality of first points of the first reference image or map into respective second reference points of the second reference image or map, respectively.

Therefore, the second reference points of the second reference image or map corresponding to most of said first reference points of the first reference image or map can be easily determined by considering the effect of said transition on said first reference points.

Put differently, the representation, on the second reference image or map, of a reference system 33 represented on the first reference image or map may be determined by the simulation of said transition. A same point of the arch is represented, on the first and second reference images or maps, by first and second reference points which have the same coordinates in the reference system 33, as represented on the first and second reference images or maps, respectively.

Figure 1C:
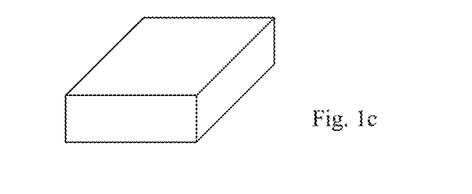
Figure 2:
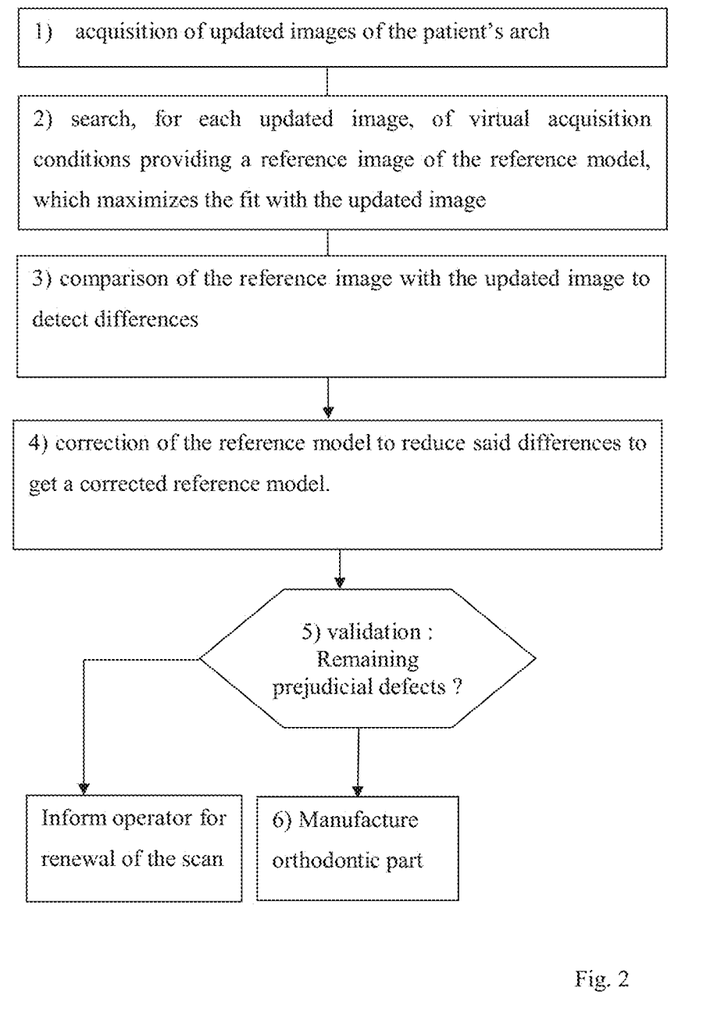

In particular, for each first outline point $32_1$, a second outline point $32_2$ having the same coordinates as the first outline point is determined. Thereby, first and second outline points are associated to define couples which each define an outline parent point 34 of the reference model.

The outline parent points are then added to the reference model, the position in space of an outline parent point being at the intersection of straight lines $\Delta_1$ and $\Delta_2$ including the first and second outline points, respectively, and parallel to the observation directions of the reference model to acquire the first and second reference images, respectively.

Preferably, one outline parent point 34 is added for each couple of first and second outline points.

In addition, the defect is deleted.

First and second "defect" points can be identified on the first and second reference maps $Cr_1$ and $Cr_2$, respectively, by superimposition with the first and second updated maps $Ca_1$ and $Ca_2$, respectively, as explained previously. Then, they are coupled, as explained previously for the first and second outline points.

Subsequently, the defect parent points are deleted from the reference model, the position in space of a defect parent point being at the intersection of straight lines including the first and second defect points of a couple, respectively, and parallel to the observation directions of the reference model to acquire the first and second reference images, respectively.

At step 5), the corrected reference model is validated. In particular, some defects might have been detected and not corrected because the updated images were not configured for the correction. For instance, if only one updated image shows a defect, this defect cannot be deleted and corrected.

The uncorrected defect may be acceptable or not, depending on its prejudicial effect.

The evaluation whether an uncorrectable defect is acceptable or not may be done by an orthodontist or by a computer, with the help of implemented rules.

If an uncorrected defect is not acceptable, the corrected reference model is not validated, and an information about the rejection of the reference model is sent, for instance to appear on a computer screen. In particular, steps 1) to 5) preferably require less than 5 minutes, preferably less than 1 minute, so that the operator of a scanner used to create the reference model can be informed about the rejection before the patient has left. A new reference model can then be immediately created and corrected.

If there remain no detected unacceptable defects, the corrected reference model is validated.

At step 6), the corrected reference model is used to manufacture an orthodontic part, for instance an aligner.

Previously, the corrected reference model may be deformed, the deformation depending on the orthodontic treatment to be applied. Conventional methods may be applied for this deformation.

As now emerges, a method according to the invention allows for an accurate and effective correction of reference models.

Obviously, the invention is not limited to the embodiments described above and represented.

In particular, the method may be implemented successively for each of the two arches or simultaneously for the two arches of the patient.

Finally, the patient is not limited to a human being. In particular, a method according to the invention may be used for another animal.

The invention claimed is:

1. A method of correction of defects of a three-dimensional digital model of an arch of a patient, being called "reference model", said method comprising the following steps:
    1) acquisition, in actual acquisition conditions, of at least one two-dimensional image of said arch, said two-dimensional image of said arch being also called updated image ($Ia_1$;$Ia_2$), the arch having the same configuration when the reference model is generated and when the updated image is acquired;
    2) search, for each updated image acquired in step 1), of virtual acquisition conditions providing a two-dimensional image of the reference model which maximizes the fit with the updated image, said two-dimensional image of the reference model being called reference image ($Ir_1$;$Ir_2$);
    3) comparison of the reference image with the updated image to detect differences;
    4) correction of the reference model to reduce said differences to get a corrected reference model;
    in which said differences stem from the resolution of a scanner used to generate the reference model and/or from the way the scanner is operated, or are generated when the reference model is produced from a plaster mold of the teeth, in which said differences represent asperities or recesses which, do not exist, in said arch.

2. A method according to claim 1, wherein the search at step 2) uses a metaheuristic method.

3. A method according to claim 1, wherein step 2) comprises the following steps:
    21) determination of virtual acquisition conditions to be tested;
    22) production of a two-dimensional reference image of the reference model to be tested in said virtual acquisition conditions to be tested;
    23) processing of the updated image and of the reference image to produce at least one updated map and reference map representing said discriminating piece of information, respectively;
    24) comparison of the updated and reference maps so as to determine a value for an assessment function, said value for the assessment function depending on the differences between said updated and reference maps and corresponding to a decision to continue or to stop the search for virtual acquisition conditions approximating said actual acquisition conditions with greater accuracy than said virtual acquisition conditions to be tested determined on the last occurrence of the step 21);
    25) if said value for the assessment function corresponds to a decision to continue said search, modification of the virtual acquisition conditions to be tested, then return to the step 22).

4. A method according to claim 1, wherein said corrected reference model is used to manufacture of an orthodontic part.

5. A method according to claim 4, wherein said orthodontic part is an aligner.

6. A method according to claim 1, wherein uncorrected defects of said corrected reference model are identified, and, at least if said uncorrected defects are potentially prejudicial for an orthodontic treatment of the patient, the reference model is rejected.

7. A method according to claim 1, wherein steps 2) to 4) are executed for more than 10 updated images.

8. A method according to claim 1, wherein the reference model is generated by a deformation of an initial reference model, which was produced by a scan of said arch of the patient.

9. A computer program comprising program code instructions for the execution of all of the steps 2) to 4) of a method according to claim 1, when said program is run by a computer.

10. An acquisition apparatus comprising:
    an image acquisition apparatus to acquire updated images of an arch of a patient;
    a scanner configured to generate a reference model of said arch;

a processing module configured to correct said reference model with said updated images to get a corrected reference model according to a method according to claim 1.

11. An acquisition apparatus according to claim 10, wherein said processing module is configured to inform an operator if a defect which has a potential prejudicial effect cannot be corrected.

12. An acquisition apparatus according to claim 10, in which the image acquisition apparatus is integrated in said scanner, and in which the updated images are used by said processing module to correct defects of the reference model generated less than 1 hour before the acquisition of said updated images.

13. A method according to claim 1, in which said model is a mesh of lines and said differences are an excess of 3D material, a distorted incisal edge, a hole or a distortion in the mesh, a double skin, a push through, an insufficient definition, or an auto intersection.

14. A method according to claim 1, in which said differences represent defects from a 3D scan representing tunnels or bridges.

15. A method according to claim 1, wherein the reference model is generated less than 1 hour before step 1).

* * * * *